Patented Oct. 10, 1944

2,360,049

UNITED STATES PATENT OFFICE 2,360,049

CHEMICAL BLOWING AGENTS

George R. Cuthbertson, Detroit, Mich., assignor to United States Rubber Company, New York, N. Y., a corporation of New Jersey No Drawing. Application October 24, 1941, Serial No. 416,388

10 Claims. (Cl. 260—724)

This invention relates to ammonium nitrite blowing agents and media. An object of the invention is to obtain certain solutions of ammonium nitrite. Another object is to use these solutions as gas-liberating agents in forming expanded rubber, whether of the cellular or unbroken cell type, or of the sponge or broken cell type. A further object is to use ethylene glycol, glycerine, etc. as reaction media for the ammonium nitrite decomposition liberating nitrogen gas. Other objects will be apparent from the following description.

The following examples illustrate the invention:

Example. 1.—Preparation of ethylene glycol solutions of ammonium nitrite: A solution of ammonium nitrite in ethylene glycol is prepared by digesting sodium nitrite, ammonium sulfate or other ammonium inorganic salt, and ethylene glycol, through which is passed a small stream of ammonia. More particularly, equal quantities of the sodium nitrite, ammonium sulfate, ethylene glycol, and approximately 5% ammonium hydroxide, are allowed to digest either at room or elevated temperature. A small stream of ammonia is passed through the mixture during the digestion period. After the digestion, the mixture is filtered, which removes sodium sulfate and any unreacted sodium nitrite or ammonium sulfate. The filtrate contains ammonium nitrite, ammonium hydroxide, and small amounts of sodium sulfate, sodium nitrite and ammonium sulfate. If it is desired to make the solution more concentrated, this can be done by redigesting with further quantities of sodium nitrite and ammonium sulfate. In general, two or three digestions are desirable for making the product used for blowing rubber to the cellular type of expanded rubber.

If increased stability of the solution is desired, a base such as ammonia, ammonium carbonate, zinc oxide, sodium hydroxide, or other stabilizers may be added to the mixture either before or after digesting. Addition of the stabilizer to the mixture before digestion permits the digestion to be carried out at a higher temperature and therefore faster. The following describes a typical preparation:

500 grams sodium nitrite, 500 grams ammonium sulfate, 500 grams ethylene glycol, 25 cc. of concentrated ammonia, are run through a paint mill. The mill is closed sufficiently to break up the crystals into fine particles. The mixture is placed in a two liter beaker. Beaker and contents are heated by means of a water bath up to 57° C.±2° C. and allowed to digest at this temperature for about 30 minutes. A small stream of ammonia is passed through the mixture and it is well stirred during the entire heating period. After the digestion, the mixture is cooled below 40° C., and the cooled mixture is filtered. The filtrate is redigested with 500 grams sodium nitrite and 500 grams ammonium sulfate under the same conditions. This redigestion increases the concentration of ammonium nitrite from approximately 36% to 66%.

As gassing agents, solutions of ammonium nitrite, especially the substantially non-aqueous solutions of ammonium nitrite, are superior gassing agents for making expanded rubber of both the cellular and the sponge types and whether soft or hard rubber. This because they minimize the salt content of the rubber and thereby reduce the consequent water adsorption of the expanded rubber.

Further, such blowing agents can be completely dispersed which leads to a very fine and uniform cell structure, especially in the cellular or unbroken cell type of expanded rubber. By the use of these blowing agents, and especially by the use of non-aqueous media, less water is introduced into the rubber compound. This leads to a low internal pressure in the cellular rubber during cure, since the quantity of water introduced into the compound is less than that necessary to give saturation pressure at the curing temperature. The lower the internal pressure during cure, the less is the chance that the surface cells will be ruptured because of uneven build-up of pressure. When cellular rubber is cured, the surface becomes heated faster than the interior, therefore the water vapor pressure increases faster near the surface than in the interior. This increased pressure expands the surface cells and compresses the interior cells and may cause rupture of the surface cells. The opposite effect takes place when the cellular rubber is cooled. Hard cellular rubber is more susceptible to the effect during cooling than soft cellular rubber.

The solutions of ammonium nitrite are well suited for blowing cellular or sponge rubber.

Ethylene glycol, glycerine, etc., may be used as non-aqueous media for nitrite ammonium salt decomposition. For this purpose, an intimate mixture is generally prepared by passing sodium nitrite, ammonium salt, ammonium hydroxide, and the medium, for example ethylene glycol, through a paint mill. A paste results which is nearly as efficient in gas production as a solution of the salts in water, and a much lower weight of the mixture is necessary to produce the same degree of blow; also less water is introduced. More specifically, this is illustrated by the following pastes:

*Example 2.*—A paste made by grinding 10 parts of sodium nitrite, 10 parts of ammonium chloride, 10 parts of ethylene glycol solution of ammonium nitrite, and 1.5 parts of ammonium hydroxide is very useful in making a light weight hard cellular rubber.

*Example 3.*—A paste made by grinding 10 parts of ethylene glycol, 10 parts of ammonium chloride, 10 parts of sodium nitrite, and 1.5 parts of ammonium hydroxide is useful in making a light weight hard cellular rubber.

Having thus described my invention, what I claim and desire to protect by Letters Patent is:

1. A gas producing composition, useful in making gas expanded rubber, which comprises a concentrated solution of ammonium nitrite in a substantially non-aqueous liquid polyhydric alcohol consisting solely of the elements carbon, hydrogen, and oxygen, the proportion of ammonium nitrite being at least about 36% and not in excess of about 66%.

2. A gas producing composition, useful in making gas expanded rubber, which comprises a concentrated solution of ammonium nitrite in ethylene glycol, the proportion of ammonium nitrite being at least about 36% and not in excess of about 66%.

3. A gas producing composition, useful in making gas expanded rubber, which comprises an alkaline concentrated solution of ammonium nitrite in ethylene glycol, the proportion of ammonium nitrite being at least about 36% and not in excess of about 66%.

4. A gas producing composition, useful in making gas expanded rubber, which comprises a mixture of a metal nitrite and an ammonium salt dispersed in a solution of ammonium nitrite in a substantially non-aqueous liquid polyhydric alcohol consisting solely of the elements carbon, hydrogen, and oxygen, the proportion of ammonium nitrite exceeding 36% but not in excess of about 66%.

5. A process which comprises mixing an ammonium salt with an alkali metal nitrite in ammoniacal polyhydric alcohol solution containing an amount of polyhydric alcohol only sufficient to maintain in solution most of the ammonium nitrite formed in the ensuing reaction but insufficient to maintain in solution the alkali metal salt formed, and heating the mixture to cause the reaction to take place, said alcohol consisting solely of the elements carbon, hydrogen, and oxygen.

6. A gas producing composition, which evolves gas under the action of heat, comprising a stable concentrated solution of ammonium nitrite dissolved in a polyhydric alcohol medium and substantially free of non-decomposable water soluble solids, said alcohol consisting solely of the elements carbon, hydrogen, and oxygen.

7. A rubber composition of low water soluble salt content containing as a blowing agent a concentrated solution of ammonium nitrite in a polyhydric alcohol consisting solely of the elements carbon, hydrogen and oxygen.

8. A semi-solid gas producing composition, which evolves gas under the action of heat, comprising a mixture of sodium nitrite, ammonium chloride and a solution of ammonium nitrite in a polyhydric alcohol consisting solely of the elements carbon, hydrogen, and oxygen, the solution containing in excess of 36% but not more than about 66% of ammonium nitrite.

9. A rubber composition of relatively low water soluble salt content containing as a blowing agent a mixture of sodium nitrite, ammonium chloride and a solution of ammonium nitrite in a polyhydric alcohol consisting solely of the elements carbon, hydrogen, and oxygen.

10. A process which comprises mixing an ammonium salt with an alkali metal nitrite in ammoniacal polyhydric alcohol solution containing an amount of polyhydric alcohol only sufficient to maintain in solution most of the ammonium nitrite formed in the ensuing reaction but insufficient to maintain in solution the alkali metal salt formed, and heating the mixture to cause the reaction to take place, said alcohol consisting solely of the elements carbon, hydrogen, and oxygen, filtering the mixture and recovering the effluent solution substantially free of alkali metal salt.

GEORGE R. CUTHBERTSON.